United States Patent
Aggarwal et al.

(10) Patent No.: US 6,714,975 B1
(45) Date of Patent: *Mar. 30, 2004

(54) METHOD FOR TARGETED ADVERTISING ON THE WEB BASED ON ACCUMULATED SELF-LEARNING DATA, CLUSTERING USERS AND SEMANTIC NODE GRAPH TECHNIQUES

(75) Inventors: Charu Chandra Aggarwal, Ossining, NY (US); Joel Leonard Wolf, Katonah, NY (US); Philip Shi-lung Yu, Chappaqua, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/829,631

(22) Filed: Mar. 31, 1997

(51) Int. Cl.⁷ .................. G06F 15/163; G06F 17/60
(52) U.S. Cl. .............. 709/224; 709/217; 709/218; 709/219; 705/14
(58) Field of Search ................... 345/349, 352; 709/217, 227, 224, 202, 218, 219; 706/11; 707/500, 3, 102, 10; 705/507, 27, 26, 14, 10; 380/49; 379/93.12; 455/4.2

(56) References Cited

U.S. PATENT DOCUMENTS

| | | | |
|---|---|---|---|
| 5,596,703 A | * 1/1997 | Eick et al. ............... 709/219 |
| 5,727,129 A | * 3/1998 | Barrett et al. ............. 395/12 |
| 5,740,549 A | * 4/1998 | Reilly et al. ............. 705/14 |
| 5,754,938 A | * 5/1998 | Herz et al. ............. 455/4.2 |
| 5,754,939 A | * 5/1998 | Herz et al. ............. 455/4.2 |
| 5,796,952 A | * 8/1998 | Davis et al. ............. 395/200 |
| 5,799,292 A | * 8/1998 | Hekmatpour ............. 706/11 |
| 5,819,285 A | * 10/1998 | Damico et al. ........... 707/104 |
| 5,835,087 A | * 11/1998 | Herz et al. ............. 345/327 |
| 5,848,396 A | * 12/1998 | Gerace ................... 705/10 |
| 5,848,397 A | * 12/1998 | Marsh et al. ............ 705/14 |
| 5,862,325 A | * 1/1999 | Reed et al. ............. 709/201 |
| 5,918,014 A | * 6/1999 | Robinson .............. 709/219 |
| 5,933,811 A | * 8/1999 | Angles et al. ........... 705/14 |
| 5,948,061 A | 9/1999 | Merriman et al. |
| 6,026,368 A | 2/2000 | Brown et al. |
| 6,029,195 A | * 2/2000 | Herz .................... 709/219 |
| 6,243,375 B1 | * 6/2001 | Speicher ................. 370/352 |

OTHER PUBLICATIONS

W3.Com Introduces Powerful Website Advertising Management Software, Business Wire: p. 10021060, Oct. 2, 1996.*
High performance DSP software using data–flow graph transformations, Sivojnovic, V.; Ritz, S.; Meyr, H., 1994 conference Record of the Twenty–Eight Asilomar, Oct. 31–Nov. 2 1994, IEEE: 94CH34546, pp. 1–2.*
Learning Possibilistic Networks from Data, Gebhardt, J.; Kruse R., Dept. of Mathematics and Computer Science, Univ. of Braunchweig, IEEE:0–7803–2461, 1995, pp. 1575–1580.*
A framework for targeting banner advertising on the Internet, Gallagher, K., Parsons, J., Nunamaker, J.F., Jr., Sprague, R. H., Jr. Fac of Bus. Adm., Memorial Univ. of Newfoundland, St. John's Nfld., Canada, Jan. 1997.*

* cited by examiner

Primary Examiner—Mehmet B. Geckil
Assistant Examiner—Beatriz Prieto
(74) Attorney, Agent, or Firm—F. Chau & Associates, LLP (57) ABSTRACT

A method for dynamically placing objects in slots on a web page in response to a current client request for the web page comprises the steps of classifying users into user groups based one or more user-characteristics, accumulating self-learning data based on user click behavior for each user group, matching the current client request with a corresponding user group and scheduling real-time selection of the slots for the objects on the web page based on the self-learning data of the corresponding user group.

57 Claims, 7 Drawing Sheets

METHOD FOR TARGETED ADVERTISING ON THE WEB BASED ON ACCUMULATED SELF-LEARNING DATA, CLUSTERING USERS AND SEMANTIC NODE GRAPH TECHNIQUES

SPECIFICATION

The present invention relates to advertisements on pages of a World Wide Web site. Specifically, it is directed to a method for dynamically assigning advertisements to web pages according to self-learned user information.

BACKGROUND OF THE INVENTION

The internet is a network of networks and gateways that use the TCP/IP suite of protocols. A client is a computer accessed by a user or viewer which issues commands to another computer called a server. The server performs a task associated with the client's command. The World Wide Web (WWW or Web) is the internet's application which displays information on the internet in a user-friendly graphical user interface format called a Web page. A Web server typically supports one or more clients. The Web allows users (at a client computer) who seek information on the internet to switch from server to server and database to database by viewing objects (images or text) and clicking (with a pointing device or keystroke) on corresponding highlighted words or phrases of interest (hyperlinks).

The Web can be considered as the internet with all of the resources addressed or identified as Universal Resource Locators (URLs) and which displays the information corresponding to URLs and provides a point-and-click interface to other URLs. A URL can be thought of as a Web document version of an e-mail address. Part of a URL is termed the Internet Protocol (IP) address.

An internet browser or Web browser is a graphical interface tool that runs internet protocols and displays results on the user's screen. The browser can act as an internet tour guide, complete with pictorial desktops, directories and search tools used when a user "surfs the net."

With the recent explosion of web-related sites and services, the internet has become a great opportunity for web-related advertising. For site administrators who maintain a large number of pages, it has become almost necessary to use some process of optimizing placement of the advertisements and scheduling of the web pages.

Typically, advertisements occur as objects in the form of (text or inline) links on Web pages. Advertisers measure the effectiveness of contracting with a particular Web server (web site) by analyzing the number of times a viewer clicks ("hits") on an advertisement. The cost of such a contract may be either directly or indirectly dependent upon this click rate. Consequently, from the point of view of the site administrator, it is desirable to maximize the total number of hits to the advertisements on the server.

Each page on a server may have a certain number of predefined slots which have standard sizes containing the object (inline image or text) links to the actual advertisement pages. The object may be an advertisement.

An advertisement is exposed when a page which contains the slot with the advertisement is served to a client accessing the page. Since a page may typically contain more than one slot, more than one advertisement may be exposed at a single time. This exposure of an advertisement is also called an impression.

An advertisement is clicked when a client decides to choose (with a pointing device or keystroke) the link corresponding to an exposed advertisement. Thus, the number of clicks for an advertisement is always a certain fraction of the number of exposures. Since the advertisement agencies measure the effectiveness of an advertisement by the number of clicks that an ad receives, and since the sum of the total number of exposures received over all slots by a site is defined by the traffic to that site, it is advantageous for a server to assign a particular advertisement to a slot in a manner such that the advertisement's click/exposure ratio is maximized.

Presently, placement of advertisements on web pages is executed by using different variations of static assignment. Static assignment produces web pages with advertisements which generally do not change unless and until the site administrator adjusts them according to some historic information. This static method of placing advertisements does not take into consideration various real-time characteristics of the web which can improve placement optimization.

For instance, certain web pages in a web site are more likely than others to be accessed by users. Without knowing which pages are the present "hot spots," static assignment is likely to result in underexposure of certain advertisements and overexposure of others. Furthermore, some advertisements are much more likely than others to be accessed at a certain time of the day. Static assignment does not take this time-dependency into consideration. Finally, static assignment provides no way of taking into consideration the individual tendencies of a particular user to choose a specific advertisement based on appearance, size, shape or location on a page.

It is a primary object of the present invention to provide a method for dynamically assigning advertisements to appropriate slots on appropriate web pages based on a characteristic of the requesting client or user, depending upon self-learning data obtained from historical user behavior.

A further object of the present invention is to provide a method of scheduling advertisements which exploits popular web pages or "hot spots."

A further object of the present invention is to provide a method of placing advertisements which avoids the problem of over-exposure and under-exposure of advertisements.

A further object of the present invention is to provide a method of placing advertisements which takes into consideration the time of day.

SUMMARY OF THE INVENTION

The present invention overcomes the prior art limitations by providing a method for placing advertisements web pages which is capable of making placement decisions "on the fly" depending on characteristics of the client or user from whom the request is received.

According to the present invention, the method for dynamically placing objects in slots on a web page in response to a current client request for the web page includes the steps of classifying users into two or more user groups based on at least one user characteristic, accumulating self-learning data based on user click behavior for each user group, matching the current request with a corresponding user group and scheduling real-time selection of the slots for the objects on the web page based on at least the self-learning data of the corresponding user group. The objects are preferably advertisements.

Preferably, a group click/exposure ratio is accumulated for each user group and the scheduling of real-time selection of the slots for the objects on the web page is based on the group click/exposure ratio for the corresponding group.

The method preferably includes the step of generating probabilistic assignment data for each user group based on a contract requirement of the objects wherein the scheduling is further based on the assignment data.

Preferably, the method also includes the step of generating probabilistic assignment data for each user group based on an exposure requirement of the object for a period of time.

It is preferable that the method further includes the step of generating probabilistic assignment data for each user group based on a popularity characteristic of the web page, such as a number of clicks on the web page for a period of time.

Because processing resources are limited in a web server, the classifying step of the present invention preferably includes the steps of probabilistically choosing a fraction of previous requests and classifying users of the fraction of previous requests into two or more user groups. In web sites which have a registration procedure (for example the New York Times), explicit demographic information is available, and this may be used in order to perform advertisement placement. Thus, according to a preferred embodiment of the invention, classification of users is executed based on user demographic information.

According to a second and third embodiment of the present invention, classification of users is executed based on user click behavior, such as user click/exposure ratios and user path traversal patterns. For example, an advertisement about job listings is likely to be very relevant to a person accessing the web page from the .edu domain. Similarly, for a car dealer in the Massachusetts area, it is more relevant that the advertisement be accessed by clients within that area. Such similar behavior on the web is utilized by these methods of user classification.

Classifying is preferably executed by using an efficient multi-dimensional clustering algorithm to classify users into user groups and is also preferably based on the particular time of the day. By taking into consideration the time of day of the request, the placement's effectiveness is maximized. Indeed, the same page should contain different advertisements depending upon the time of the day.

Preferably the method of the present invention minimizes repetitive exposure of objects to users by further basing the scheduling on exposures of objects on previous web pages requested by a same user so that repetitive exposure of the same object is controlled.

The size, appearance and/or position of said objects are preferably varied during scheduling and the variation is preferably traversal path dependent.

Since the method of the present invention is a self-learning method, classification of the users preferably includes the steps of collecting user characteristic data, such as click/exposure ratio data, based on previous object assignments, analyzing the user characteristic data so that new user characteristic data is discovered and classifying the users into two or more user groups based on the new user characteristic data. Preferably, a fraction of the previous assignments are randomly made to provide unbiased learning.

It is also preferable for the classification of users to be further based on a sensitivity of the corresponding user group to variations in size and location of the slots on the web page. Preferably, the method of the present invention further includes the step of collecting statistics representing the impact of different slot sizes and locations on click/exposure ratios for the user groups.

To improve user classification efficiency, the method preferably includes the step of classifying objects and web pages into classes. This may be done by assigning keywords to classes of objects and web pages and classifying objects and web pages into classes, or by selecting a set of popular web pages with high click rates, classifying objects with similar click/exposure ratios on the set of popular web pages into object groups, classifying web pages experiencing similar click/exposure ratios for objects in each of the object groups into page groups, adding web pages to the set, and repeating the classifying steps.

It is preferable in the method of the present invention to randomly schedule a fraction of the objects to web pages so that self-learning is improved. It is also preferable to schedule on a web page different numbers of slots with differing sizes and locations on the web page to improve self-learning.

It is preferable to generate the assignments of the objects by assigning each of the objects to an object node in group O, assigning each of a the web pages to a page node in group P, providing an arc between a page node and at least one of the object nodes as a function of a classification of the objects and the web pages, assigning an object node flow requirement to each object node based on periodic contract requirements of a corresponding object, assigning a page node flow requirement to each page node based on an expected popularity of a corresponding web page, introducing a flow supply node having an arc to each object node, said flow supply node providing a supply flow, assigning a flow weight to each arc between the page nodes and the object nodes based on a function of group click/exposure ratios resulting from placing the corresponding objects on the corresponding web pages, and assigning a flow to each arc between the object nodes and the page nodes with a probabilistic assignment method so that the supply flow flows through the arcs to the page nodes and in-flow equals out-flow for each object node and in-flow is less than the node flow requirement for each page node, wherein a total return of the assignment is maximized.

Finally, it is preferable to include the steps of maintaining cumulated statistics on exposures for the corresponding user group within a required range of tolerance as a result of the probabilistic assignment data and choosing objects for the slots based on a function of the cumulated statistics and the range of tolerance. Preferably, the objects are chosen for the slots based on a largest outstanding requirement as dictated by the difference between the cumulated statistics and a targeted rate for the corresponding user group.

BRIEF DESCRIPTION OF THE DRAWING

Further objects, features and advantages of the invention will become apparent from the following detailed description taken in conjunction with the accompanying figures in which.

Throughout the figures, the same reference numerals and characters, unless otherwise stated, are used to denote like features, elements, components or portions of the illustrated embodiment. Moreover, while the subject invention will now be described in detail with reference to the figures, it is done so in connection with preferred embodiments. It is intended that changes and modifications can be made to the described embodiments without departing from the true scope and spirit of the subject invention as defined by the appended claims.

DETAILED DESCRIPTION

Figure 1:
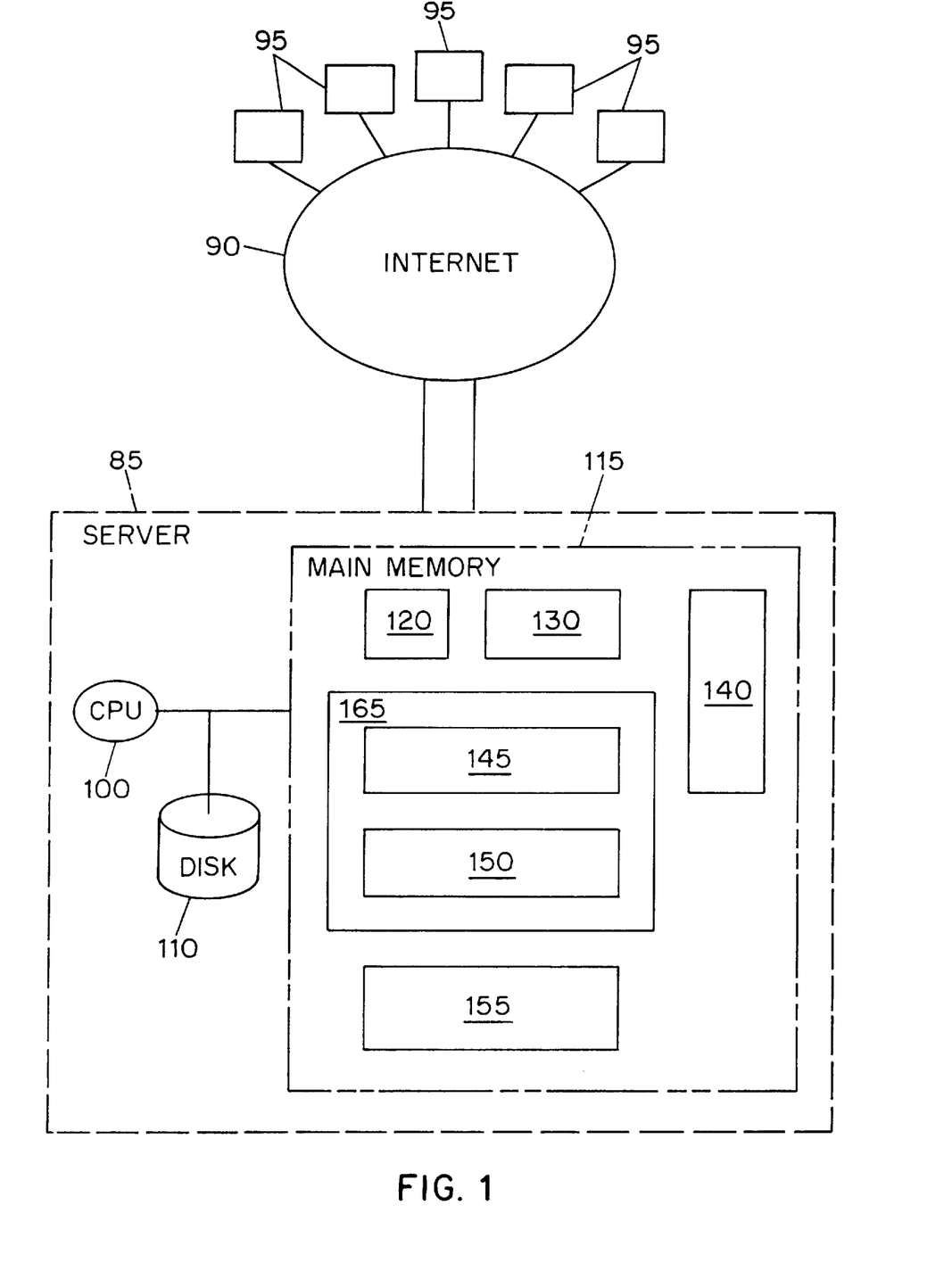
FIG. 1 is a diagram of an overall architecture used in accordance with a preferred embodiment of the present invention.

FIG. 1 is an example of an overall architecture in accordance with a preferred embodiment of the present invention. In the context of a typical internet architecture, a particular server (web site) 85 has multiple clients 95 which access the server over the network or internet 90. The server includes a central processing unit 100, storage 110 and main memory 115. The structures necessary to perform the self-learning analysis of the present invention are present in memory 115. A self-learning data collector 130 is used to collect click self-learning data 145 stored in memory 115. A self-learning analyzer 140 analyzes the self-learning data 145 and generates even more refined self-learning data 145. This refined data is used by a self-learning scheduler 150 to create the advertising assignments in real-time. The advertisement assignments may be stored either in module 155 of main memory 115 or in storage 110. In addition, a memory buffer or cache 120 may be present to improve real-time performance in a manner known to those skilled in the art.

Figure 2:
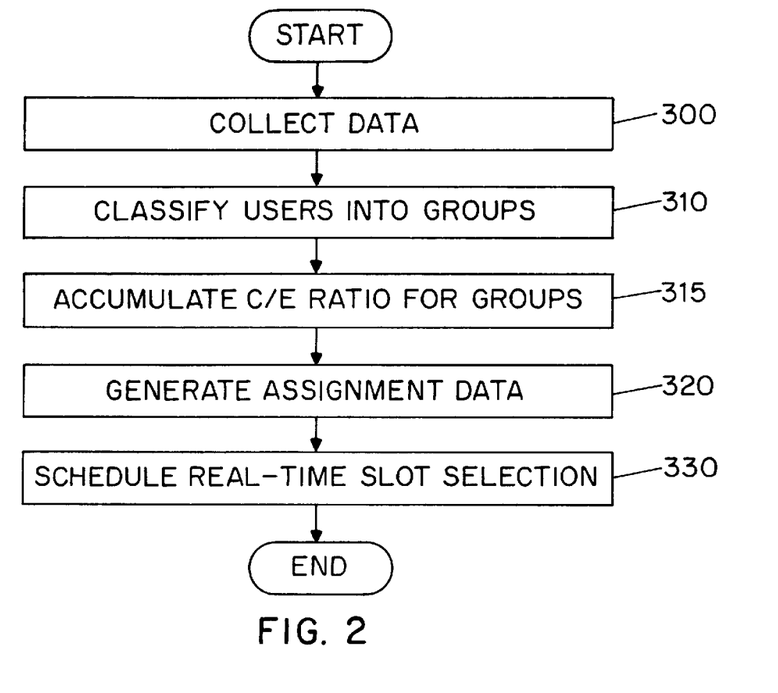
FIG. 2 is a chart illustrating a preferred embodiment of the present invention.

FIG. 2 depicts an example of the overall method according to the present invention. In step 300, self-learning data is collected over time based upon user clicks on advertisements. This process of data collection and subsequent refinement is a continuous process, which is performed in parallel with the following steps 310, 315, 320, and 330. Steps 310, 315, 320, and 330 follow step 300 in the flow chart to illustrate the fact that the steps 310, 315, 320, and 330 may only use data which has been collected before the moment in time when these steps are executed.

In step 310, the users are classified into user groups based upon one or more user characteristics. Preferably, a spatial clustering algorithm using either demographic information or using IP address identification together with the self-learning data, e.g. user-based click ratios or traversal path patterns, collected by self-learning data collector 130, is utilized. Each of these groups may be treated distinctly, and may be further subdivided into subgroups based upon the time of the day of the request.

In step 315, self-learning data based on click/exposure (or "c/e") ratios for each user group is accumulated. In step 320, the self-learning analyzer 140 is used to generate probabilistic assignment data for each user group, and this data is collected by the self-learning data collector 130. Finally, in step 330, the self-learning scheduler 150 uses the self-learning data to create the real-time dynamic slot-selection, when a client request is received.

Figure 3:
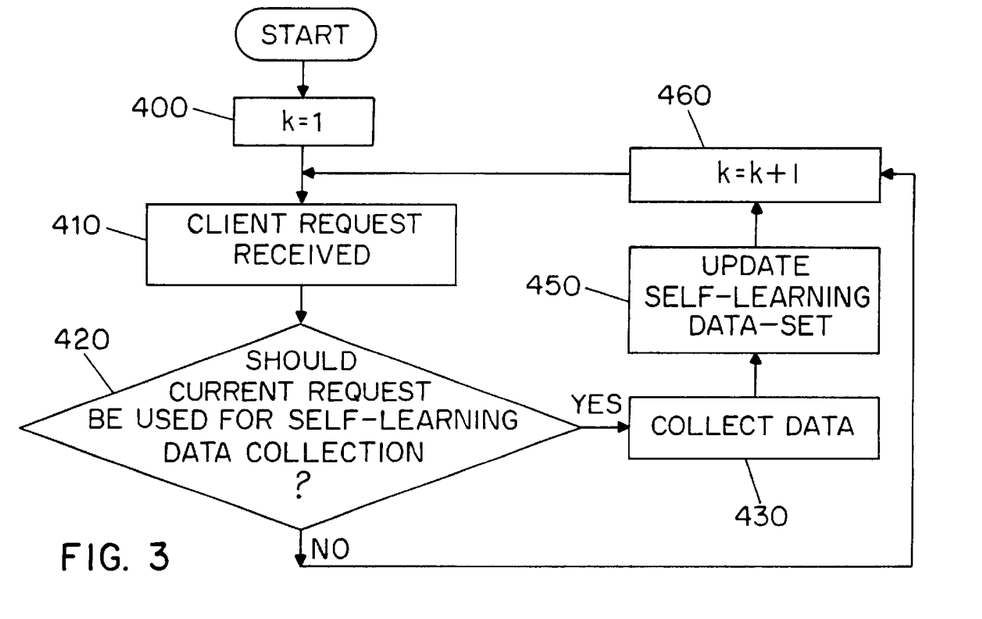
FIG. 3 is a chart illustrating a preferred embodiment of the data collection algorithm step of the invention of FIG. 2.

FIG. 3 illustrates a preferred embodiment of the data collection process of step 300. In step 400, a discrete counter k, representing the iterative order of the client requests received, is initialized to "1." In step 410, a client request is received. In step 420, a decision is made, based on predetermined probability, whether or not to use the current request for self-learning data collection. Because requests used for self-learning data collection are not designed to result in optimal scheduling, it is practical to use only a fraction of the client requests while performing the data collection. This fraction of requests, or probability, may vary with the popularity of the web server, i.e. smaller fractions may be collected for more popular servers.

If a decision is made not to use the current request for self-learning, the process continues in step 460 where the counter is incremented (for the next request). If the decision is made to use the request, data representing click/exposure ratios or traversal path patterns is collected in step 430. In step 450, the self-learning data set is updated with the new data.

Figure 4A:
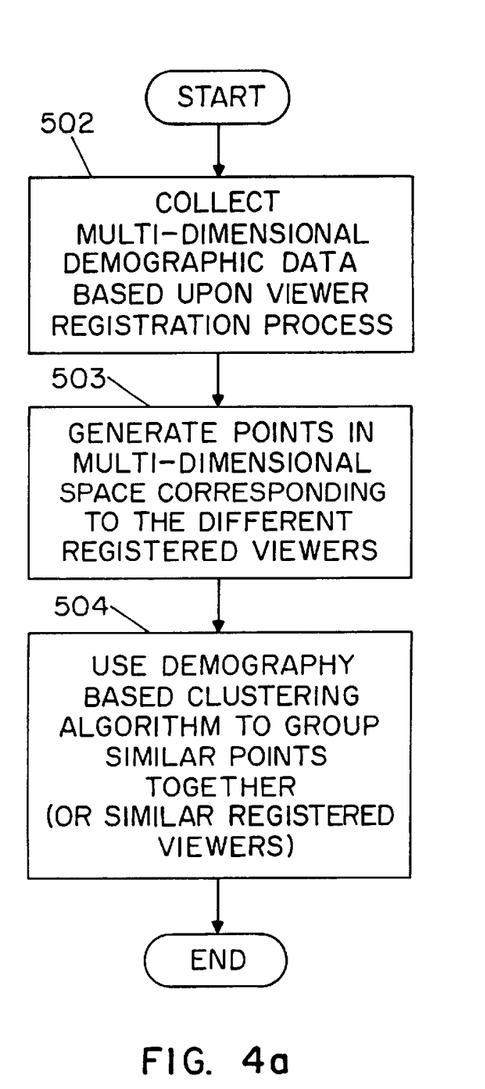
FIGS. 4a, 4b and 4c are charts illustrating three separate methods of classifying users into groups in accordance an embodiment of the invention of FIG. 2.

The clients, or users, are preferably clustered by two different methods: demography-based and user click-based. The demography-based method, a preferred embodiment of which is illustrated in FIG. 4a, is only useful for sites in which user registration is available (e.g., New York Times) because the collection of multi-dimensional data corresponds to user demography, e.g. age, gender, salary, etc. This multi-dimensional data is used to cluster similar users together. Therefore, because self-learning data is not used to cluster in the demography-based method, self-learning data need not be collected in step 300 of FIG. 2.

In step 502 of FIG. 4a, which is executed during the initial registration of a user, multi-dimensional demographic data concerning the user is collected. In step 503, data points are generated in multi-dimensional space corresponding to different registered users. Preferably, this demographic data is used to cluster the spatial data with two constraints, known as critical mass and partition cardinality, which may be set by the site administrator.

Because, each of the clustered groups must have a sufficient amount of information collected to produce reliable analysis of the self-learning data, critical mass is taken into consideration. In a simplified model, the critical mass is defined as the minimum number of data points (or registered users) in a cluster for sufficient data to be collected. In a more complex model, for each user (or IP address), a weight is assigned corresponding to the number of impressions created in a fixed period of time. The collective weight of a group is the sum of these values for the group's users. Critical mass, in this case, is defined as the minimum collective weight value for each group to obtain sufficient data collection.

Because a separate network flow problem must be solved for each clustered group of users, it is preferable to partition the users into a limited number of groups for the sake of computational efficiency of the central processing unit 100 in the web server. Partition cardinality is defined as the maximum number of clustered groups used to separate the data points. Thus, a lower partition cardinality equates to a higher computing efficiency. In step 504, a demography-based clustering algorithm, such as the algorithm described in T. Zhang et al., "BIRCH: An Efficient Clustering Method for Very Large Databases", Proceedings of 1996 ACM SIGMOD Conference on Management of Data, Montreal, Canada, June 1996, is used to group similar points (registered users) together.

Figure 4B:
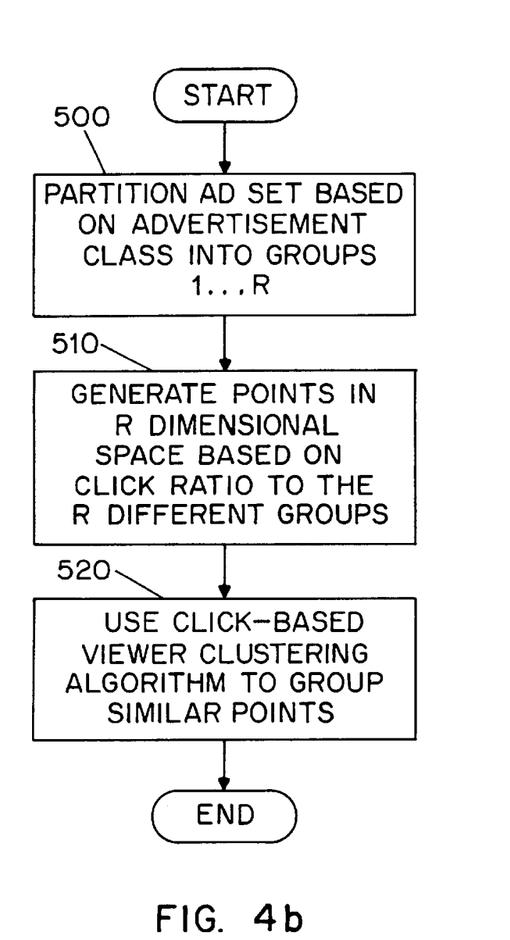

FIG. 4b depicts a preferred embodiment of the method of clustering viewers based on user clicks. This type of clustering identifies large segments of IP addresses (corresponding to individual clients or web provider servers) which share a heavy correlation in terms of user click behavior. As a simple example, IP addresses with logical (domain) names ending with .edu represent a set of students, professors and researchers who likely access pages in a similar fashion and who are likely to access an advertisement about job listings. In fact, this simplified domain-based clustering may be used to cluster users into groups based on their extension only and, like demography-based clustering, would not require the collection of self-learning data.

However, the more complex user click-based clustering must take into consideration self-learning data in the form of user click behavior collected in step 300 of FIG. 2. In step 500, different dimensions (1 ... R) corresponding to various advertisement classes, e.g., luxury cars, are generated. These classes may be generated by a site administrator. Next, in step 510, click/exposure ratios for the different advertisement classes are measured for each client's (or web provider's) IP address, and data points in the corresponding multi-dimensional space are generated in accordance with these click/exposure ratios. In step 520, a spatial clustering algorithm, such as T. Zhang et al., "BIRCH: An Efficient Clustering Method for Very Large Databases", is used on this set of points to partition the data collected from the user set into groupings (by IP address).

Figure 4C:
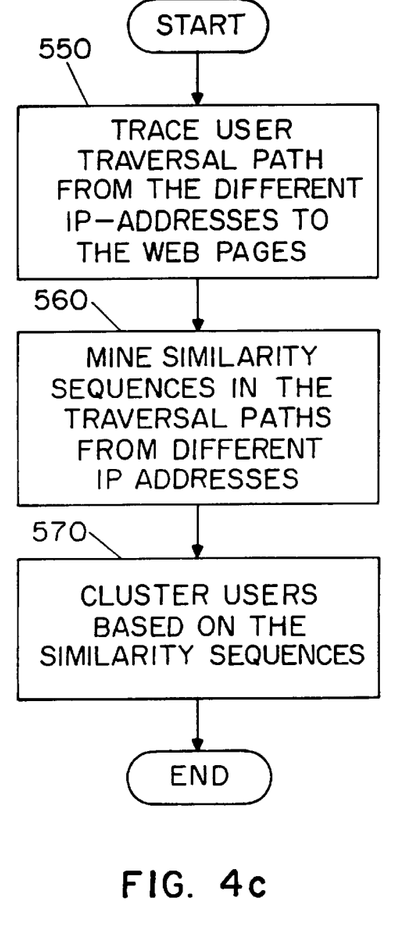

FIG. 4c depicts another preferred embodiment of the method of clustering viewers based upon user clicks. In this embodiment, path traversal patterns are used to indicate user behavior instead of click/exposure ratios. Path traversal patterns are measured by user clicks and the order of web pages accessed. As with the advertisements above, the web pages may be classified into groups to improve the efficiency of the user classification. In step 550, the data corresponding to the traversal path to the web pages from different IP addresses is collected. In step 560, popularly occurring similarity sequences in the particular traversal paths may be found using a data mining algorithm such as that described in R. Agrawal and R. Srikant, "Mining Sequential Patterns", Proceedings of the 11th International Conference on Data Engineering, pp. 3–14 (1995). Finally, in step 570, users who have similar traversal paths are clustered together into one group using a clustering algorithm such as that described in T. Zhang et al., "BIRCH: An Efficient Clustering Method for Very Large Databases."

As an alternative to simple site administrator classification of advertisements or web pages, an iterative method based on accumulated self-learning data may be used to classify advertisements and web pages into groups to provide further efficiency to the system. In this regard, a set of popular web pages may be selected from all the web pages at a site and the advertisements are then classified into groups resulting in similar click-exposure ratios when placed on these popular pages. Finally, all the web pages may be classified into groups of pages on which the classified group of advertisements experience similar click exposure ratios. This method may be repeated as additional web pages are added to the set of popular web pages and the self-learning data is accumulated.

Figure 5:
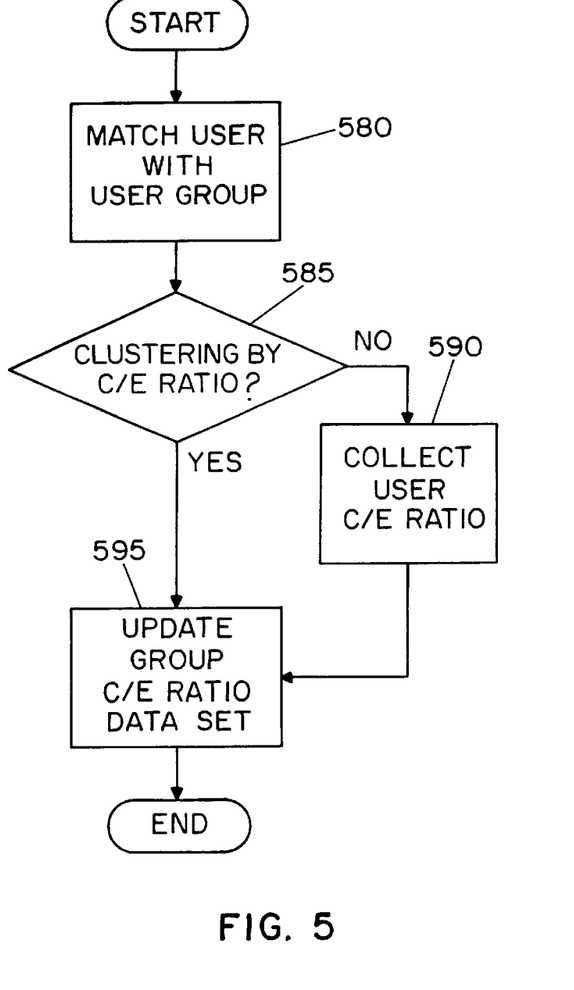
FIG. 5 is a chart of an embodiment of the step of accumulating self-learning data based on click/exposure ratios for each user group in FIG. 2.

FIG. 5 depicts a preferred embodiment of the step of accumulating self-learning data based on click/exposure ratios for each user group illustrated in step 315 of FIG. 2. In step 580, the user who delivers a request to the server which is used for clustering is matched with a particular user group which has been previously classified. If the user does not match any particular group, a new group may be created, depending on the clustering algorithm. Next, in step 585, if clustering was implemented by IP address and click/exposure ratio, then the process continues in step 595. If click/exposure ratio data was not collected to cluster, the process continues in step 590 where the user's click/exposure ratios are now collected. In step 595, the group's click/exposure ratio data set is updated with the user's click/exposure ratio data. The resulting data may be stored in tables with the different groups on one side and the group click-exposure ratios on the other.

Figure 6:
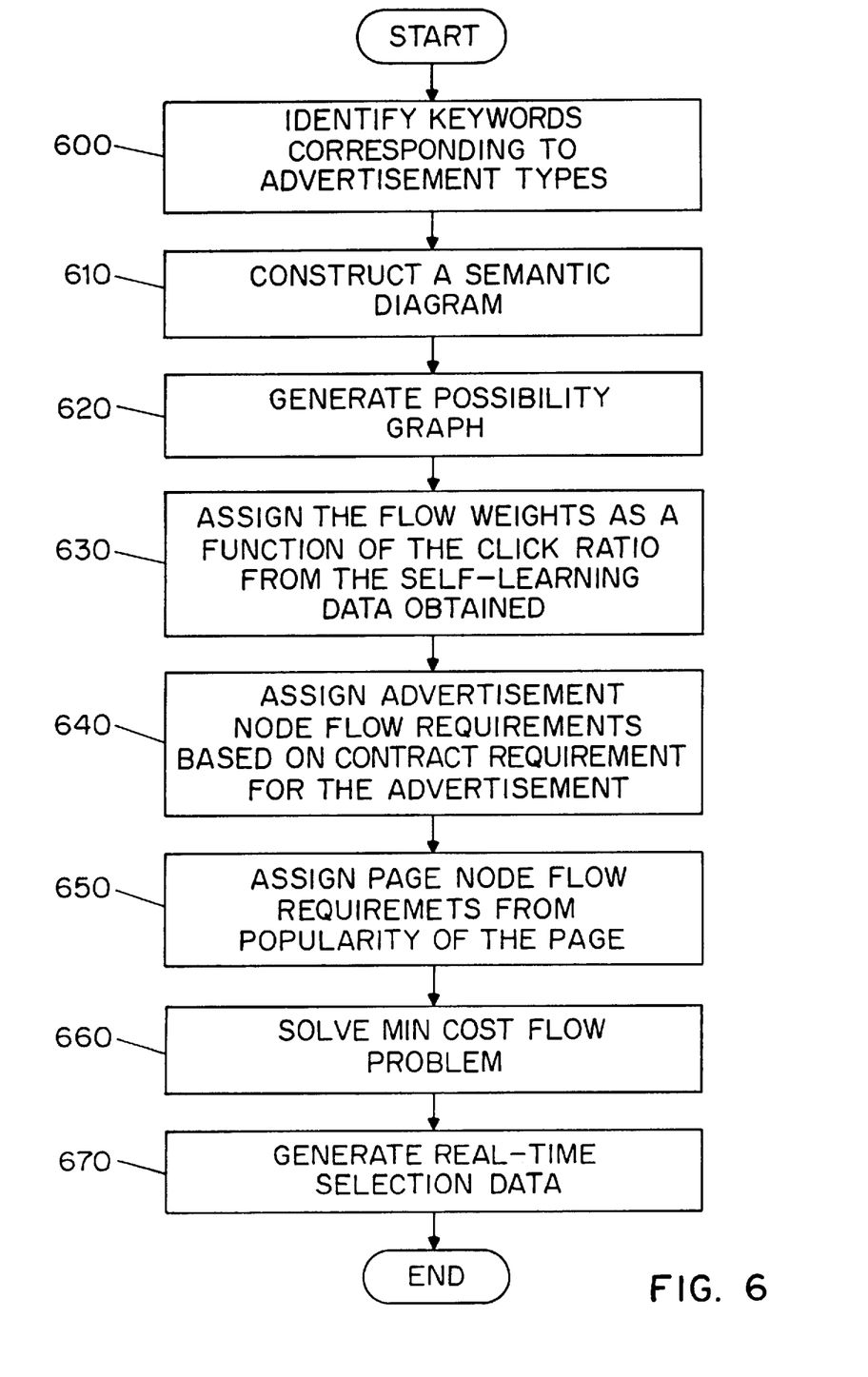
FIG. 6 is a chart illustrating an embodiment of the probabilistic assignment data generating step of FIG. 2.

FIG. 6 depicts a preferred embodiment of a process by which the collected self-learning data may be refined by performing a self-learning analysis to generate probabilistic assignments as in step 320 of FIG. 2. To perform this process, a network called a possibility graph corresponding to the possibilities for assigning advertisements to pages is built and used to generate the refined self-learning data as discussed below.

To do so, in step 600, keywords corresponding to the different advertisement classes generated, as mentioned above, are identified. The web site administrator assigns a certain number of specific keywords to each of the web pages corresponding to the page content. The keywords should correspond to classes of advertisements which can be hosted on a particular web server. To provide flexibility to the system, the keyword "generic" can be used for those advertisements or pages lacking a specific keyword.

Figure 7:
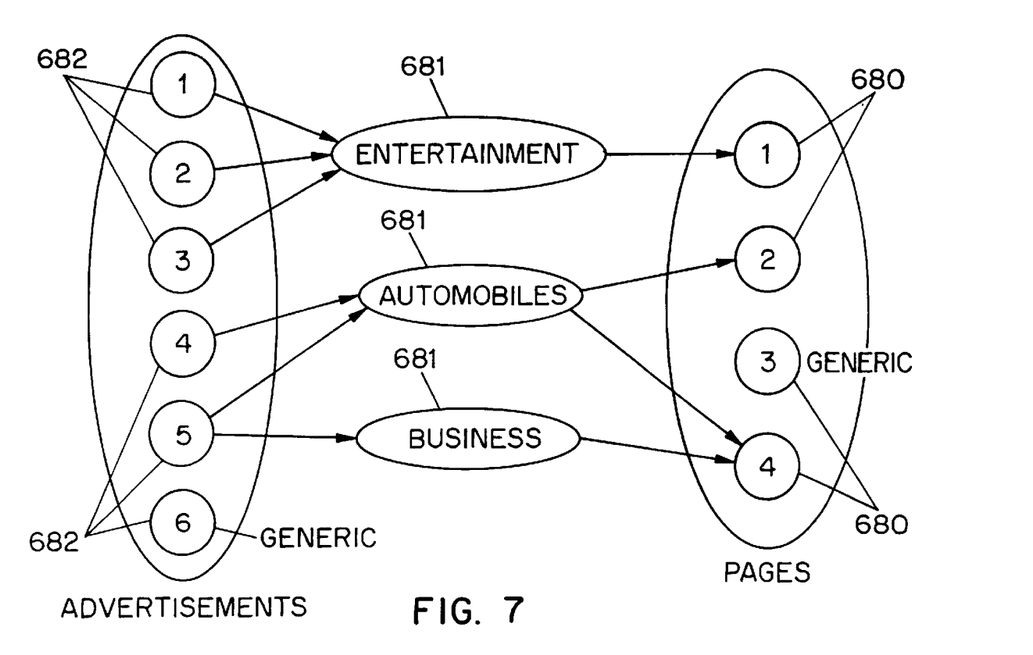
FIG. 7 is a semantic diagram created in the generating step of FIG. 6.

In step 610, a semantic diagram is constructed with each node corresponding to a web page, a keyword or an advertisement. The semantic diagram, shown in FIG. 7, is constructed so that a page node 680 is connected to a keyword node 681 if that page falls in the keyword category. Similarly, an advertisement node 682 is connected to a keyword node 681 if that advertisement falls in the keyword category. In addition, different versions of the advertisements are preferably treated independently when building the semantic graph.

Figure 8:
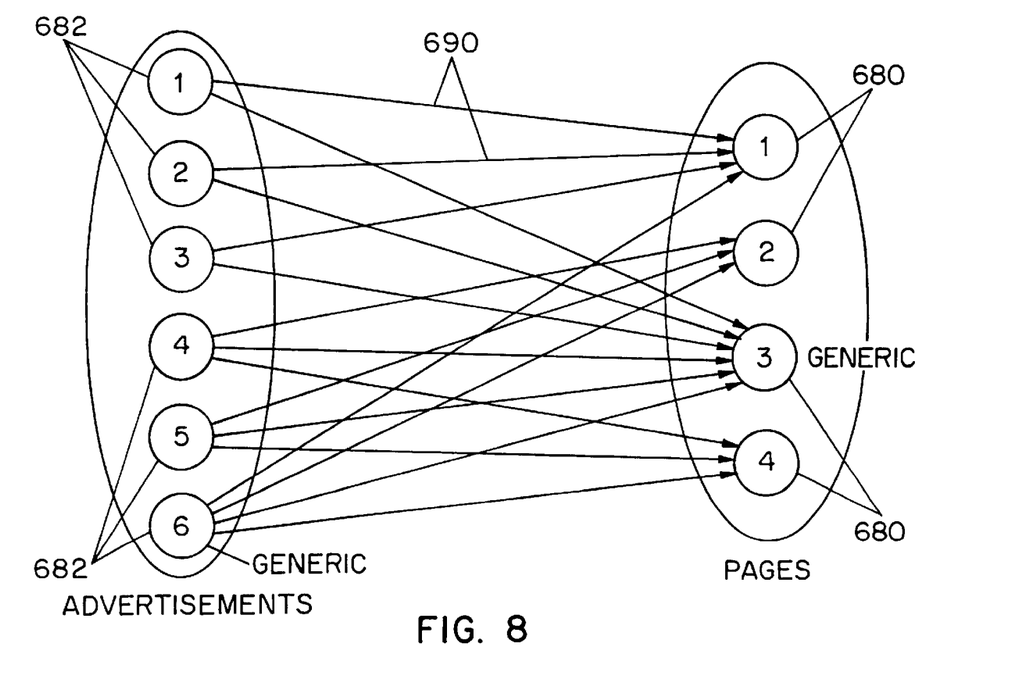
FIG. 8 is a possibility graph created in the generating step of FIG. 6.

In step 620, the semantic diagram is used to generate the above-referenced possibility graph containing a node for each page and each advertisement. In FIG. 8, a possibility graph created from the semantic diagram of FIG. 6 is illustrated. A page node 680 is connected, by an arc 690, to an advertisement node 682 on the possibility graph if a path exists in the semantic diagram from page node 680, through keyword node 681, to advertisement node 682. The possibility graph preferably takes into account the differing sizes and shapes of the page slots while performing advertisement assignments. This possibility graph is duplicated for each group.

In step 630, flow weights are assigned to each of the arcs 690 between respective page nodes and advertisement nodes on the possibility graphs for each group. The flow weights (usually negative numbers) are assigned as a function of the accumulated group click/exposure ratios resulting from placing the ads on the respective pages. This data is derived from the self-learning data obtained in step 595 of FIG. 5. In step 640, advertisement node flow requirements are assigned based on periodic contract requirements for the advertisement, e.g., monthly requirement of 100,000 exposures to site. In step 650, page node flow requirements are assigned based on the expected popularity of the page for the period in question, e.g., 30,000 clicks over the last month. This popularity is measured by accumulated historic data using forecasting methods generally known to those skilled in the art. The group-specific assignments made in steps 640 and 650 preferably correspond to the appropriate time slots in the day for which the analysis is being done. The method is thus made sensitive to the time-of-day. In step 660, a minimum cost network flow problem on the possibility graph is solved in a manner generally known to those skilled in the art. Preferably, a flow supply node (not illustrated) is provided and connected by arcs to each of the advertisement nodes. All the supply flow must flow out through the arcs to the page nodes. The network flow problem may then be solved, e.g., by minimizing the number obtained from multiplying the flows by the respective flow weights and adding these values over all the arcs. Finally in step 670, real-time selection data is generated by the resulting flows on the arcs denoting the rates at which the various advertisements should be assigned or should appear on the different slots. This is the refined real-time selection data, representing target statistics for a particular time period, which is stored in self-learning data 145 of FIG. 1.

Figure 9:
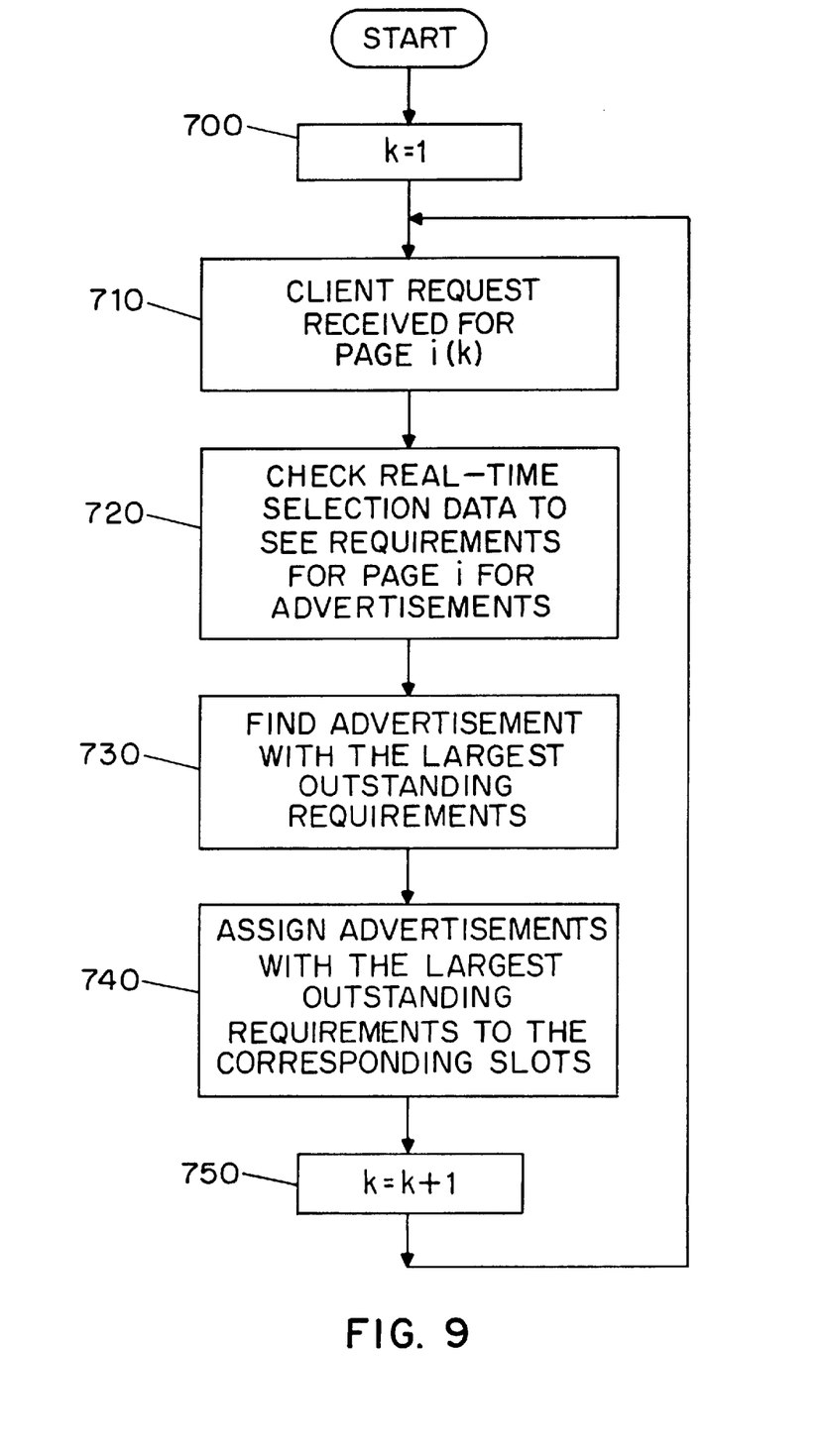
FIG. 9 is a chart illustrating an embodiment of the real-time dynamic slot selection step of FIG. 2.

FIG. 9 depicts a preferred embodiment of the process of real-time advertisement assignment performed by the self-learning scheduler 150 of FIG. 1. In step 700, an incremental counter k, which maintains the order in which the client requests are received, is initialized to "1." In step 710, a client request for page i(k) is received. Preferably, the client is identified by some characteristic such as domain name or IP address and is matched to one of the classified groups. In step 720, the real-time selection data in self-learning data 145 is checked for the particular time period within which the request was received to view the advertisement assignment requirements of page i for the client's group. In step 730, the advertisement with the largest outstanding requirements (defined by the real-time selection data target rate of an advertisement assignment minus the number of assignments made within the time period for the particular advertisement) is identified from the network flow problem. While choosing the advertisement with the largest outstanding requirements, the system preferably takes into consideration repetitive use of the same advertisement. That is, the system is designed to prevent the exposure of the same advertisement to a user when the user returns to a page within a web site session. This may be implemented by breaking ties with regard to outstanding requirements in favor of lessening repetition. Additionally, since the advertisement slots could be of multiple sizes and in multiple locations, the slot size and location is also taken into account during the real-time assignment process. In step 740, the advertisements with the largest outstanding requirements are assigned to the corresponding slots, as dictated by the real-time selection data. Finally, in step 750, the counter k is incremented by 1.

While certain embodiments of the present invention have been discussed hereinabove, other modifications of the invention will occur to those skilled in the art and it is intended that the scope of the invention be limited only as set forth in the appended claims.

We claim:

1. A method for dynamically placing objects in slots on a web page in response to a current request for said web page, comprising the steps of:

classifying users into a plurality of user groups based on at least one user characteristic;

accumulating, for each user group, self learning data based on user click behavior during web page accesses;

matching a user identification of a current request for a web page with a corresponding user group;

creating a semantic diagram having nodes corresponding to web pages, keywords, and the objects;

generating a graph based upon the semantic diagram, the graph representing possibilities for assigning the objects to the web pages; and dynamically selecting one or more objects, and one or more slots on said requested web page in which to position said one or more objects, based on at least said self-learning data of said corresponding user group and the graph.

2. The method of claim 1 wherein said accumulating step comprises the step of accumulating a group click/exposure ratio for each user group and wherein said dynamically selecting step comprises the step of selecting said one or more objects and said one or more slots for said objects on said web page based on said group click/exposure ratio for said corresponding group.

3. The method of claim 1 further comprising the step of generating probabilistic assignment data for each user group based on a contract requirement of said objects and wherein said dynamically selecting step is further based on said assignment data.

4. The method of claim 3 wherein said generating step comprises the step of generating probabilistic assignment data for each user group based on an exposure requirement of said object for a period of time.

5. The method of claim 3 wherein said classifying step comprises the step of classifying objects and web pages into a plurality of classes so that user classification efficiency is improved.

6. The method of claim 5 wherein said classifying step comprises the steps of:

assigning keywords to classes of objects and web pages and classifying objects and web pages into a plurality of said classes so that user classification efficiency is improved.

7. The method of claim 5 wherein said classifying step comprises the steps of:

selecting a set of popular web pages with high click rates;

classifying objects with similar click/exposure ratios on the set of popular web pages into object groups;

classifying web pages experiencing similar click/exposure ratios for objects in each of said object groups into page groups;

adding web pages to said set; and repeating said classifying steps.

8. The method of claim 7 wherein said slots have differing sizes and locations on said web page.

9. The method of claim 3 wherein the dynamically selecting step comprises the steps of:

maintaining cumulated statistics on exposures for said corresponding user group within a required range of tolerance as a result of said probabilistic assignment data; and choosing objects for said slots based on a function of said cumulated statistics and said range of tolerance.

10. The method of claim 9 wherein the choosing step comprises the step of choosing objects for said slots based on a largest outstanding requirement as dictated by a difference between said cumulated statistics and a targeted rate for said corresponding user group.

11. The method of claim 1 further comprising the step of generating probabilistic assignment data for each user group based on a popularity characteristic of said web page.

12. The method of claim 11 wherein said generating step comprises the step of generating probabilistic assignment data for each user group based on a number of clicks on said web page for a period of time.

13. The method of claim 1 wherein said classifying step comprises the steps of:

probabilistically choosing a fraction of previous requests and classifying users of said fraction of previous requests into a plurality of user groups.

14. The method of claim 1 wherein said classifying step is based on user demographic information.

15. The method of claim 1 wherein said classifying step is based on user click behavior.

16. The method of claim 15 wherein said classifying step is based on user click/exposure ratios.

17. The method of claim 15 wherein said classifying step is based on user path traversal patterns.

18. The method of claim 1 wherein said dynamcally selecting step is further based on exposures of objects on previous web pages requested by a same user so that repetitive exposure of the same object is controlled.

19. The method of claim 1 wherein the dynamically selecting step comprises the step of varying a size, appearance and/or position of said objects.

20. The method of claim 19 wherein the varying step is traversal path dependent.

21. The method of claim 1 wherein said classifying step comprises the steps of:

collecting user characteristic data based on previous object assignments;

analyzing said user characteristic data so that new user characteristic data is discovered;

classifying users into a plurality of user groups based on said new user characteristic data.

22. The method of claim 21 wherein said user characteristic data is click/exposure ratio data.

23. The method of claim 21 wherein a fraction of said previous assignments are randomly made.

24. The method of claim 1 wherein said objects are advertisements.

25. The method of claim 1 wherein said classifying step is further based on a sensitivity of said corresponding user group to variations in size and location of said slots on said web page.

26. The method of claim 25 further comprising the step of collecting statistics representing the impact of different slot sizes and locations on click/exposure ratios for said user groups.

27. The method of claim 1 wherein said classifying step comprises the step of using an efficient multi-dimensional clustering algorithm to classify users into a plurality of user groups.

28. The method of claim 1 wherein said dynamically selecting step comprises the step of randomly scheduling a fraction of said objects to said web page so that self-learning is improved.

29. The method of claim 1 wherein said dynamically selecting step comprises the step of scheduling on said web page different numbers of said slots.

30. The method of claim 1 wherein said classifying step is further based on time of day.

31. The method of claim 1, wherein said method is implemented by a program storage device readable by machine, tangibly embodying a program of instructions executable by the machine to perform said method steps.

32. The method of claim 1, wherein the one or more objects and the one or more slots are dynamically selected in real-time.

33. The method of claim 1, wherein said selecting step is further based on said requested web page.

34. The method of claim 1, wherein, upon serving said requested web page, a number of expected clicks of said one or more objects is maximized.

35. The method of claim 1, wherein, the graph comprises object nodes and page nodes respectively corresponding to the objects and the web pages, and arcs for connecting the object nodes to the page nodes, and wherein object node flow requirements and page node flow requirements are respectively assigned to the object nodes and the page nodes, and flow weights and a flow are assigned to the arcs.

36. The method of claim 35, wherein the arcs connect the object nodes to the page nodes as a function of a classification of the objects and the web pages.

37. The method of claim 35, wherein the object node flow requirements are assigned to the object nodes based on periodic contract requirements of a corresponding object.

38. The method of claim 35, wherein the page node flow requirements are assigned to the page nodes based on an expected popularity of a corresponding web page.

39. The method of claim 35, wherein the flow weights are assigned to the arcs based on a function of group click/exposure ratios resulting from placing the objects on the web pages.

40. The method of claim 35, wherein said generating step comprises the step of introducing a flow supply node having an arc to each of the object nodes, the flow supply node providing a supply flow.

41. The method of claim 35, wherein the flow to each of the arcs is assigned such that the supply flow flows through the arcs to the page nodes and in-flow equals out-flow for each of the object nodes and in-flow is less than the node flow requirements for each of the page nodes.

42. The method of claim 35, wherein the flow to each of the arcs is assigned using a probabilistic assignment method.

43. The method of claim 1, wherein said creating step connects a page node to a keyword node in the semantic diagram if a corresponding page falls in a corresponding keyword category.

44. The method of claim 43, wherein said creating step connects an object node to the keyword node in the semantic diagram if a corresponding object falls in a corresponding keyword category.

45. The method of claim 44, wherein the page node is connected by an arc to the object node in the graph if a path exists in the semantic diagram from the page node through the keyword node to the object node.

46. The method of claim 35, wherein the arcs connect the object nodes to the page nodes as a function of a classification of the objects and the web pages, and the object node flow requirements and the page node flow requirements are respectively assigned to the object nodes and the page nodes based on periodic contract requirements of a corresponding object and an expected popularity of a corresponding web page, respectively.

47. The method of claim 46, wherein said generating step comprises the step of introducing a flow supply node having an arc to each of the object nodes, the flow supply node providing a supply flow.

48. The method of claim 47, wherein the flow to each of the arcs is assigned such that the supply flow flows through the arcs to the page nodes and in-flow equals out-flow for each of the object nodes and in-flow is less than the node flow requirements for each of the page nodes.

49. The method of claim 48, wherein the flow to each of the arcs is assigned using a probabilistic assignment method.

50. The method of claim 48, wherein the flow weights are assigned to the arcs based on a function of group click/exposure ratios resulting from placing the objects on the web pages.

51. A method for dynamically placing objects in slots on a web page in response to a current request for said web page, comprising the steps of:

classifying users into a plurality of user groups based on at least one user characteristic;

generating probabilistic assignment data for each user group based on a contract requirement of said objects;

accumulating, for each user group, self learning data based on user click behavior during web page accesses;

matching a user identification of a current request for a web page with a corresponding user group; and dynamically selecting, in real-time, one or more objects, and one or more slots on said requested web page in which to position said one or more objects, based on at least said self-learning data of said corresponding user group, said requested web page, and said probabilistic assignment data, wherein said generating step comprises the steps of:

assigning each of said objects to an object node;

assigning each of a plurality of web pages to a page node;

providing an arc between a page node and at least one of said object nodes as a function of a classification of said objects and said web pages;

assigning an object node flow requirement to each object node based on periodic contract requirements of a corresponding object;

assigning a page node flow requirement to each page node based on an expected popularity of a corresponding web page;

introducing a flow supply node having an arc to each object node, said flow supply node providing a supply flow;

assigning a flow weight to each arc based on a function of group click/exposure ratios resulting from placing said corresponding objects on said corresponding web pages; and assigning a flow to each arc with a probabilistic assignment method so that said supply flow flows through said arcs to said page nodes and in-flow equals out-flow for each object node and in-flow is less than said node flow requirement each page node, wherein a total return of the assignment is maximized.

52. The method of claim 51, wherein, upon serving said requested web page, a number of expected clicks of said one or more objects is maximized.

53. A method for dynamically placing objects in slots on a web page in response to a current request for said web page, comprising the steps of:

classifying users into a plurality of user groups based on at least one user characteristic;

accumulating, for each user group, self learning data based on user click behavior during web page accesses;

matching a user identification of a current request for a web page with a corresponding user group;

creating a semantic diagram having nodes corresponding to web pages, keywords, and the objects;

generating a graph based upon the semantic diagram, the graph representing possibilities for assigning the objects to the web pages; and dynamically selecting one or more slots on said requested web page in which to position one or more of the objects, based on at least said self-learning data of said corresponding user group and the graph.

54. The method of claim 53, wherein said step of selecting the one or more objects comprises the step of dynamically selecting, in real-time, said one or more objects, based on at least said self-learning data of said corresponding user group and said requested web page.

55. The method of claim 53, wherein, upon serving said requested web page, a number of expected clicks of said one or more objects is maximized.

56. The method of claim 53, wherein the one or more slots are dynamically selected in real-time.

57. The method of claim 53, wherein said method is implemented by a program storage device readable by machine, tangibly embodying a program of instructions executable by the machine to perform said method steps.

* * * * *